United States Patent [19]
Jacobson et al.

[11] 3,915,155
[45] Oct. 28, 1975

[54] THERMODILUTION DEVICE

[75] Inventors: Nils Bertil Jacobson, Solna; Kurt Tommy Ribbe, Alvsjo, both of Sweden

[73] Assignee: Hoffmann-La Roche Inc., Nutley, N.J.

[22] Filed: Feb. 4, 1974

[21] Appl. No.: 439,190

[30] Foreign Application Priority Data
Feb. 9, 1973  Sweden .............................. 7301802

[52] U.S. Cl. .............................. 128/2.05 F; 73/204
[51] Int. Cl.² ........................................... A61B 5/02
[58] Field of Search ........... 128/2.05 F, 2 A; 73/204

[56] References Cited
UNITED STATES PATENTS

| | | | |
|---|---|---|---|
| 3,403,555 | 10/1968 | Versaci et al. ............. | 128/2.05 F X |
| 3,446,073 | 5/1969 | Auphan et al. ........................ | 73/204 |
| 3,545,428 | 12/1970 | Webster, Jr. .................... | 128/2.05 F |
| 3,561,266 | 2/1971 | Auphan et al. ........................ | 73/204 |
| 3,604,263 | 9/1971 | Auphan et al. ........................ | 73/204 |
| 3,651,318 | 3/1972 | Czekajewski.................... | 128/2.05 F |
| 3,678,922 | 7/1972 | Philips et al.................... | 128/2.05 F |
| 3,733,899 | 5/1973 | Auphan et al. ........................ | 73/204 |

FOREIGN PATENTS OR APPLICATIONS 1,086,396   8/1960   Germany........................ 128/2.05 F Primary Examiner—Kyle L. Howell
Attorney, Agent, or Firm—Samuel L. Welt; Bernard S. Leon; Mark L. Hopkins

[57] ABSTRACT

An arrangement for determining in vivo a patient's blood flow by means of injecting a predetermined quantity of an indicator fluid into the patient's blood stream which has a thermostabilized temperature differential relative to the circulating blood and then detecting the change in temperature of the blood at a point below the injection site. The arrangement enables a known quantity of indicator to be injected at a fixed known temperature at a substantially constant rapid predetermined rate. The arrangement is comprised of a control assembly having a source of pumping action, a thermostabilized unit, a calculator and a programmer which oversees the injection process and the subsequent determination of blood flow, and a sterile disposable assembly which is largely contained in the thermostabilized unit and is comprised of a heat exchanger coupled to a source of indicator fluid, a syringe mechanism coupled to the source of pumping action and a directional valve arrangement intercoupling the heat exchanger and syringe mechanism to a catheter leading to the patient. Gas bubble detection means is also provided in conjunction with the disposable assembly which operates to prevent or inhibit the injection process respectively whenever gas bubbles are detected in the fluid upon a loading or an emptying of the syringe mechanism.

22 Claims, 8 Drawing Figures

THERMODILUTION DEVICE

BACKGROUND OF THE INVENTION

The invention concerns an arrangement for measuring blood flow in vivo by injecting a definite quantity of an indicator, which is characterized by its having a known difference in temperature compared with blood, and by measuring the change in temperature so obtained in the circulating blood at a point below the site of injection.

Measurement of the blood flow is of great medical importance. One must diagnose circulatory insufficiency in time in order to prevent the development of shock and damage to internal organs resulting from deficient oxygen supply. It is very important, for example, to be able to measure the blood volume pumped by the heart per minute, the so-called heart minute-volume, during operations of infarct.

The minute-volume of the heart can be measured by thermodilution. A known amount of an indicator, physiological saline, for example, or a glucose solution with a known temperature, is injected into the right atrium, whereupon a temperature sensor which has been introduced into the pulmonary artery measures the instantaneous drop in temperature caused when the blood flow, with the added, cooled indicator, reaches the temperature sensor, The heart minute-volume can be calculated since it is inversely proportional to the reduction in temperature integral.

The technique is not widely used because of the difficulty of injecting a sterile solution with known temperature and under standard conditions and at a constant rate of injection. By using cooled syringes, which can be connected by hand to a catheter which has been introduced into the heart, they can be warmed during treatment. Furthermore, the indicator cannot be manually injected with sufficient pressure to cause enough turbulence for a complete mixture of indicator fluid with the blood to occur.

Automatic devices for injecting cooled fluids have been constructed, but these could not be used clinically without risk because they were difficult to sterilize and because they could not be managed well enough to definitely avoid air bubbles in the system; air bubbles should not be permitted to gain entry into the vascular system because they impede capillary circulation by means of surface tension effects.

SUMMARY OF THE INVENTION

The principal object of this invention is to provide an arrangement by means of which the indicator can be injected under standard conditions into the vascular system of the patient, and measurements made without any danger of complications.

The invention is characterized in that the arrangement is comprised of two main assemblies which are separate as far as sterilization is concerned, but which functionally interact with each other; one of the assemblies is comprised of a thermostabilized unit 3, a mechanism for effecting a pumping action 12, 13, a calculator 16 and a programmer 17 for controlling the injection; the other main assembly is comprised of a sterile disposable unit which is intended to be coupled to reservoir means 1 containing indicator fluid; the disposable unit in turn is comprised of a heat exchanging means 2 to be introduced into the aforesaid thermostabilized unit, as well as a syringe mechanism 7 to be inserted into the aforesaid mechanism, and a valve arrangement 4, 8 with a directional effect, such that indicator fluid which is pumped from the reservoir means via the aforementioned heat exchanging means flows into the syringe mechanism and thereupon via the catheter to the patient.

Some features and advantages of the apparatus according to the invention are that known volumes of indicator at a known temperature can be injected very rapidly in a short time, and that a good mixture with blood is obtained under conditions which are safe for the patient because sterile conditions can be maintained and injection of air avoided.

BRIEF DESCRIPTION OF THE DRAWINGS

The invention may be better understood by making reference to the following description taken in conjunction with the accompanying drawings, in which.

DESCRIPTION OF THE PREFERRED EMBODIMENT(S)

Figure 1:
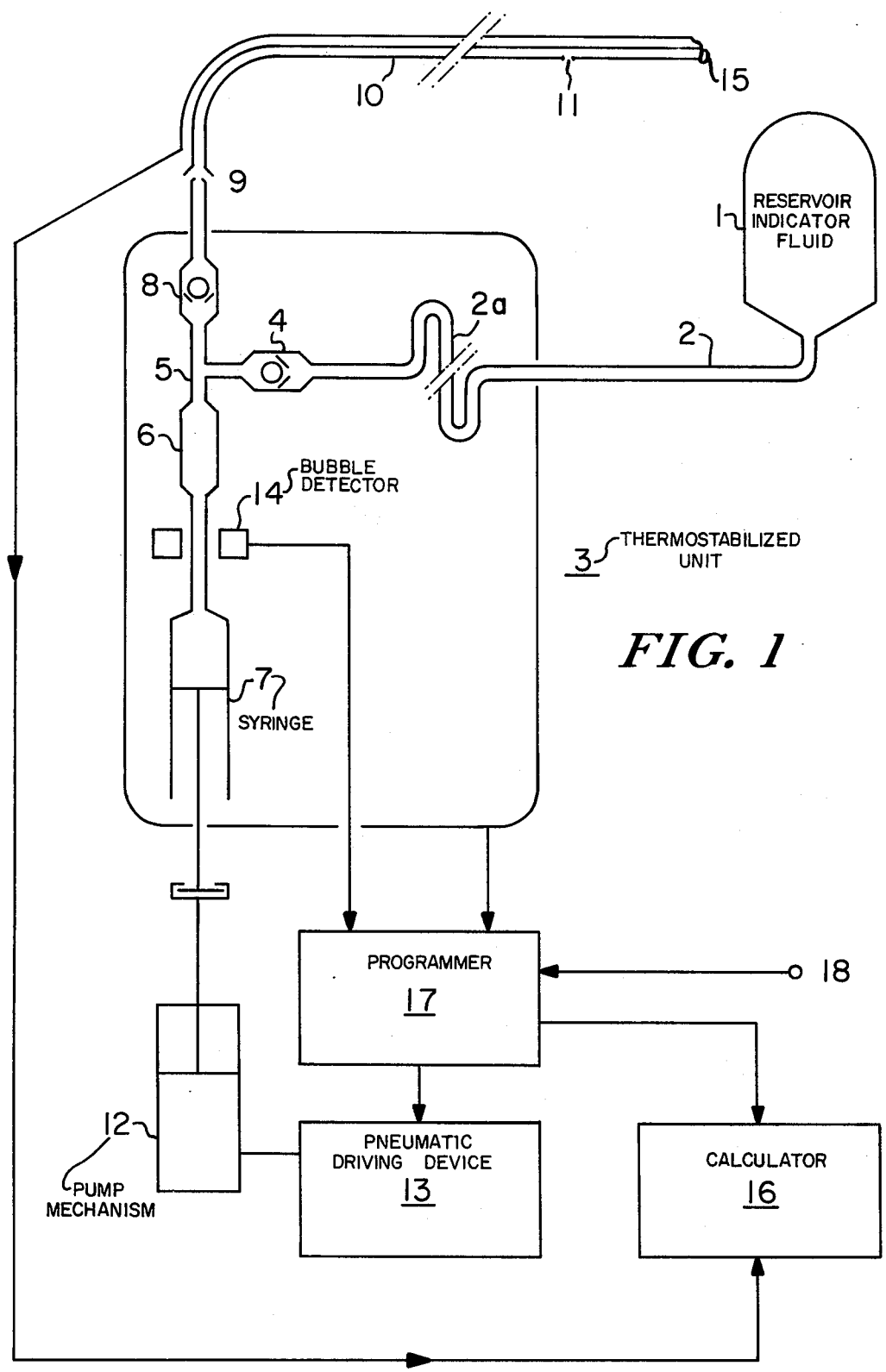
FIG. 1 is a diagrammatic sketch of an arrangement according to the invention.

The principle of an arrangement embodying the invention may be seen from FIG. 1. A reservoir bottle 1 containing a sterile indicator (indicator fluid) is connected with a hose arrangement 2, which is wound spirally 2a, in a thermostat arrangement (thermostabilized unit) 3. The hose arrangement 2 is furthermore connected via a back-pressure valve 4 to a T-tube 5, the lower part of which leads via a chamber 6 to a syringe mechanism 7. The upper part of the T-tube 5 leads via a second back-pressure valve 8 and a coupling 9 to a catheter 10, which possesses an opening 11 from which, in the vascular system, the indicator leaves the catheter the syringe is connected with a pump mechanism 12 which is driven by a pneumatic device 13.

The line between the chamber 6 and the syringe 7 leads into a bubble detector 14. This can consist of a photoelectric device which contains a light source, for example, a light (optical) diode, and a photocell which measures the light transmission by means of the above-mentioned line. Due to the different refractive indices of the indicator and of air, differences occur in the light which enters the photo cell when air bubbles pass through the tube. The bubble detector 14 can also consist of a dielectric recording device which contains two electrodes arranged on both sides of the aforementioned line, whereby the capacitance between electrodes determines the frequency of an electronic oscillator. As a result of variations in dielectric constants of the indicator and the air, the frequency of the aforementioned oscillator is altered.

A thermal sensor 15 is connected via lines in the catheter 10 to a calculator 16 by means of which there occur integration and further processing of the temperature differences which arise if the blood containing the added indicator flows past the aforementioned thermal sensor.

The arrangement is controlled by means of a programmer 17. The programmer 17 initiates the calculator 16 and the injection after synchronization with the patients' coronary flow or respiratory flow, as the case may be, via a sensor at the connection 18; stops the processing of results in the calculator; prevents injection if, when the syringe 7 is being filled, air is observed by the bubble detector 14 and/or interrupts the injection if air passes the bubble detector when indicator is being injected; and prevents injection if the thermostat arrangement 3 has not reached the desired temperature.

The sterile disposable unit consists of the hose 2, valves 4 and 8, the T-tube 5, chamber 6 and the syringe 7. The catheter 10 and reservoir bottle 1 can also be part of the disposable unit.

The thermostat arrangement 3 will now be described in more detail. It consists of a heat-insulated aluminum block which is cooled by means of a Peltier element. This is cooled in turn with the help of the airstream from a blower which is directed against cooling flanges which are in thermal contact with the warm side of the Peltier element. A spiral groove is built into a cylindrical part of the aforementioned aluminum blocks; the hose 2 is pressed into this groove for the purpose of a good thermal contact with the aluminum block for cooling the indicator during its flow to the syringe 7. The syringe is placed in a recess built for it — just as for the T-tube, valves 4 and 8, chamber 6 and bubble detector 14 — in the cooled aluminum block.

The bubble detector 14 operates in the following manner. If air enters the hose 2, then it will be conducted along with the fluid upon aspiration into the syringe 7 and in so doing it will pass the bubble detector 14. The programmer 17 then receives a signal which leads to blocking of the pneumatic device 13 so that an injection cannot occur. If due to leakage between the piston and the wall, air enters the syringe upon aspiration, then the bubble detector signals the programmer during injection. The pneumatic device is thus blocked and changes to an aspiration mode. This change-over from injection to aspiration requires, however, a certain time. To prevent the air bubble from going through the catheter into the patient, the chamber 6 has a volume that corresponds at least to the change in volume of the syringe during the time between detection of an air bubble and the change in direction of movement of the piston. The air bubble cannot, therefore, reach the catheter 10.

The pump mechanism 12 can also consist of an electric device, for example, of such a nature that the pneumatic cylinder which is depicted in FIG. 1 as element 12 is replaced by a linear electric motor. The pneumatic device 13 is correspondingly then replaced by electric circuits for driving the motor.

Operation of the calculator 16 and the programmer 17 will be described below, together with certain structural details of the calculator. For a better comprehension of that, however, certain difficulties of the thermodilution method will be lightly touched upon.

Upon injection of the cooled indicator, the first portion of the indicator is warmed somewhat as it flows through the catheter 10. When the injection has ended, the catheter is cooled off from the cooled indicator passing therethruough; as a result, the surrounding blood is somewhat cooled. Hereby, the desired drop in temperature occurs somewhat later than expected and the temperature of the catheter does not take on the temperature of the blood immediately following injection. This latter effect is usually called "wash out". A further problem is that the temperature of the blood is normally not constant but rather varies somewhat. Two kinds of variation occur. One is a periodic variation which is usually synchronous with respiration and has a slower rate of occurrence. Special circuits have been developed for reducing the effect of these variations from the ideal temperature curve. Also, pulsations in temperature drop following indicator injection occur in thermodilutions; these are due to the pulsating flow of the blood.

Figure 2:
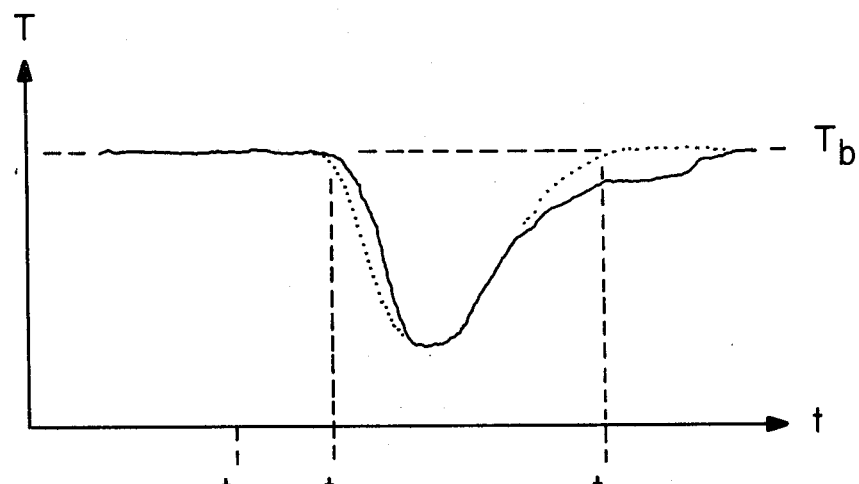
FIG. 2 is a plot indicating decreased temperature, recorded in the blood vessel, as a function of time.

In conjunction with FIGS. 2, 3 and 4, a setting of the programmer will be described, whereby, to a certain extent, compensation is made for the warming of the indicator at the start of injection, and cooling of the blood by the catheter following injection. FIG. 2 represents the temperature T as recorded by the sensor 15 as a function of time $t$ following injection of a known amount of indicator during a short period. The normal temperature level of the blood is represented by $T_b$. The indicator is injected at $t_1$; at $t_2$ the temperature recorded by the sensor in the catheter begins to drop; at $t_3$ the indicator injected into the blood has passed the sensor. The solid line in FIG. 2 represents the actually recorded change in temperature, and the dotted line represents the change in temperature which would have been obtained if the indicator has not been warmed at the start of the injection, or if the blood temperature had not decreased by the catheter after the injection ended. Integration of the temperature variation should occur according to a course which is shown by the dotted line, but actually occurs, however, according to the solid line.

Figure 3:
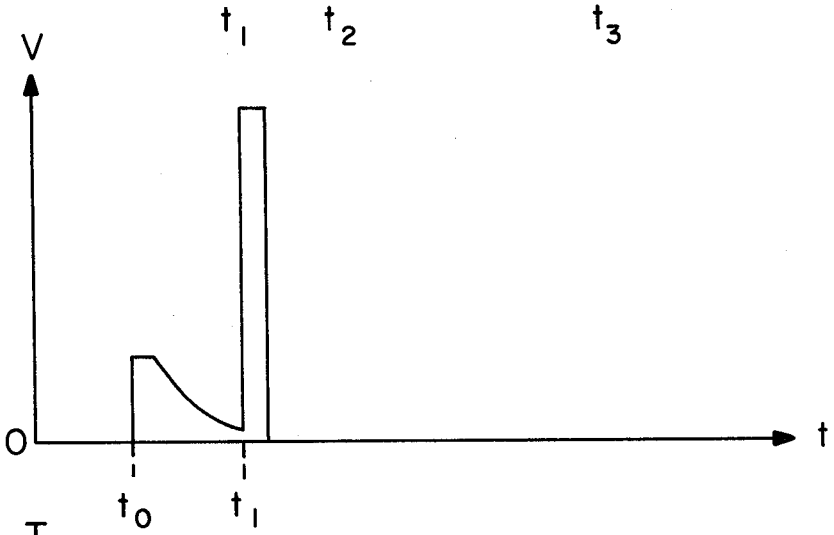
FIG. 3 illustrates a plot of the injection rate of the indicator as a function of time or a given setting of the arrangement.
Figure 4:
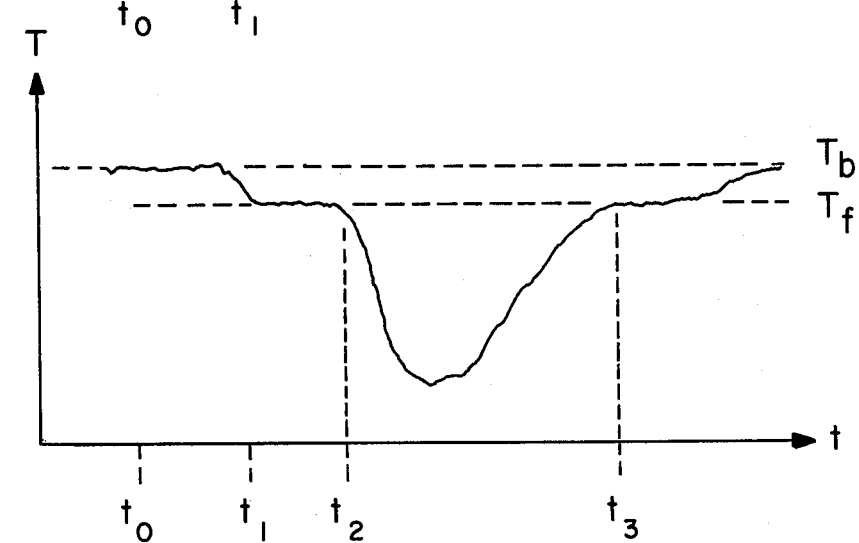
FIG. 4 shows a plot of the decreased temperature, recorded in the blood vessel, as a function of time, when the indicator is injected at the rate shown in FIG. 3.

This difficulty can be avoided by starting to inject a smaller amount at point $t_o$ before rapid injection at $t_1$, as shown in FIG. 3, so that the catheter is filled with cold indicator and thereupon only a smaller amount is injected slowly into the blood. This is shown in FIG. 3, where the amount $v$ per unit time of indicator injected is entered as a function of time $t$. By means of the preliminary injection during time interval $t_o$ to $t_1$, the temperature — as shown in FIG. 4 — is decreased initially in such a way that the baseline is decreased to a value of $T_f$, corresponding essentially to a drop in the baseline following passage of the rapidly injected indicator. Baseline $T_f$ is used as a reference in integration of the curve.

Preliminary injection during the period of time $t_o$ to $t_1$, FIG. 3, will provide such a flow profile that a level which is as good as constant will be obtained for the new baseline $T_f$ in the period immediately before and after time $t_1$.

In order to facilitate determination of the flow, integration of a signal which represents the temperature change recorded by the sensor 15 has to occur in the calculator. Integration should occur in relationship to a baseline which represents the temperature of the blood without any indicator added. The natural variations in temperature which occur normally in the blood must be considered.

Two different devices for compensating for the natural variations in temperature will now be described: one compensates for a slow flow and the other compensates for periodic fluctuations in the baseline. Both procedures can be advantageously combined in practice, but each will be described here separately.

Figure 5:
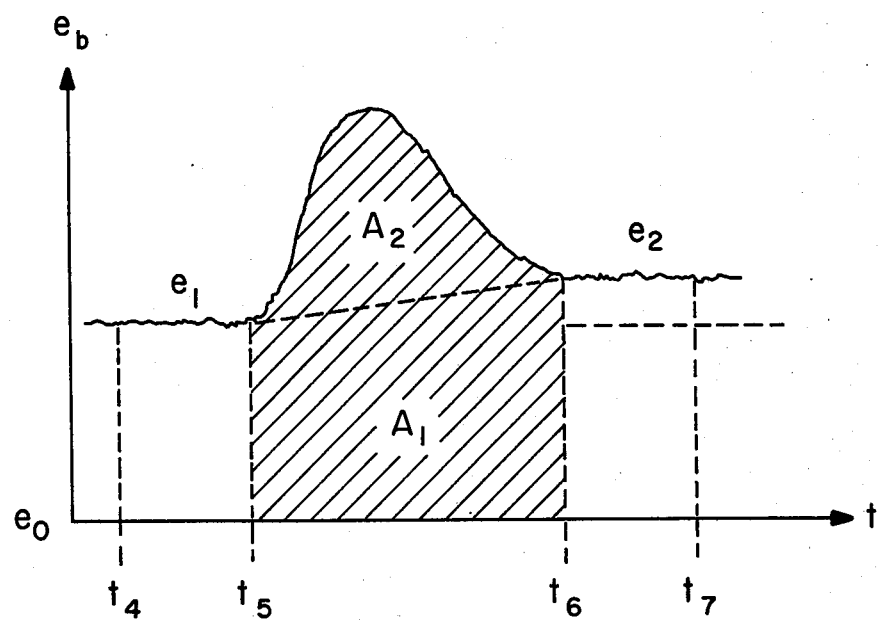
FIG. 5 illustrates the principle underlying the correction of a slow shift in baseline, in a graph representing the drop in temperature in a blood vessel as a function of time.
Figure 6:
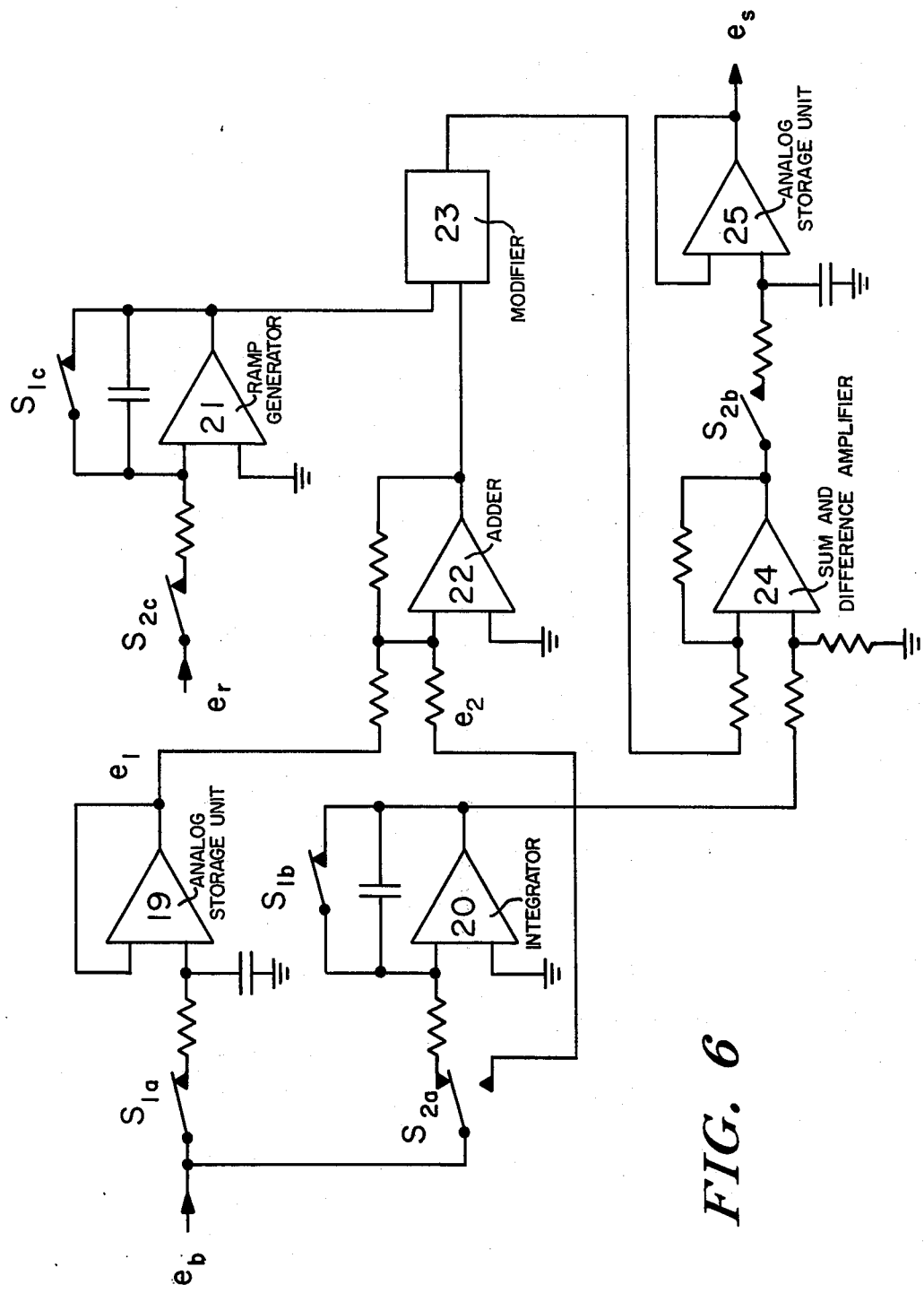
FIG. 6 is a schematic diagram illustrating an arrangement with which correction of a slow baseline shift can be accomplished.

The slow shift in baseline can be compensated for by subtracting a correction factor from the integrated value after integration has occurred. The correction factor is calculated as a function of the signals which represent the blood temperature before injection and after integration, and further, as a function of the time during which integration occurs. This can occur in a way — represented in principle in FIG. 5 — in which signal $e_b$ is represented corresponding to the recorded blood temperature as a function of time $t$, and with a circuit as shown in the circuit diagram in FIG. 6. The circuit calculates — using an analog method — the difference between integrated surfaces $A_1$ and $A_2$, in FIG. 5. A value $e_1$ of the signal $e_b$ which represents the blood temperature before injection during time interval $t_4$–$t_5$ (FIG. 5) is first stored in an analog storage unit 19, i.e. contact $S_{1a}$ (FIG. 6) is closed. During this interval an integrator 20 is set to zero via contact $S_{1b}$ being closed and ramp generator 21 is shorted out, i.e. $S_{1c}$ is closed. If $S_{1a}$, $S_{1b}$ and $S_{1c}$ are interrupted, integration starts and proceeds in relationship to an electrical zero-level $e_o$ (FIG. 5), with the aforementioned ramp generator being simultaneously engaged. The reference voltage $e_r$ in the latter is selected such that an output signal is received which is proportional to half the time difference of $t_6$–$t_5$ (FIG. 5). When integration has been concluded, contact $S_{2a}$ is thrown, $S_{2b}$ closed and $S_{2c}$ interrupted. When $S_{2a}$ is thrown, the voltage $e_2$ now appearing at the input to stage 22 is added to the stored voltage $e_1$ in the analog storage unit 19. When $S_{2c}$ is interrupted, the aforementioned ramp generator stops and its voltage is multiplied with the added voltage from stage 22, i.e. $e_1 + e_2$, in modifier 23. The product thus obtained is proportional to the trapezoidal area $A_1$ in FIG. 5. The aforementioned voltage is substracted proportionally to $A_1+A_2$ in sum-and-difference amplifier 24 from the voltage at the output of the integrator 20. Thus, a signal $e_s$ is obtained in analog storage unit 25, which is proportional to surface area $A_2$ representing the desired value which is necessary for calulation of the blood flow.

Figure 7:
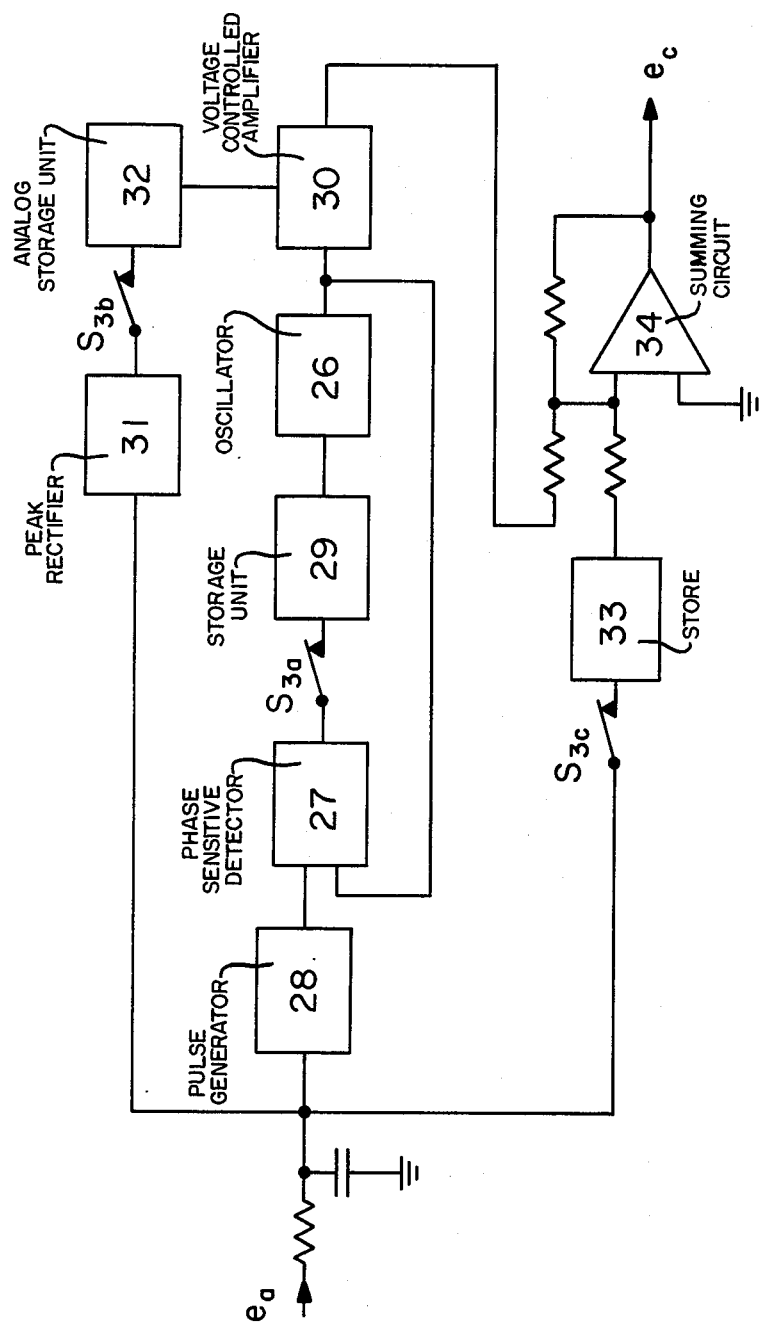
FIG. 7 is a schematic diagram illustrating an arrangement with which correction of periodic shifts of the baseline can be accomplished.

Periodic fluctuations in the baseline can be compensated for so that integration occurs in relationship to a baseline which oscillates with the same frequency, phase and amplitude as the temperature of the blood. A circuit for producing a baseline with this characteristic is shown in FIG. 7. An oscillator 26 is controlled by a signal which represents the frequency, phase and amplitude of the variations in blood temperature.

Frequency and phase control is accomplished by means of a phase-sensitive detector 27 which is driven via a pulse-generating circuit 28 with an alternating current voltage component $e_a$ which represents the variations in blood temperature. After the injection has begun, control of the oscillator 26 by the phase-sensitive detector 27, by means of contact $S_{3a}$, is turned off. The oscillator 26 then continues to operate in an oscillation mode determined by the value stored in the storage unit 29.

The amplitude of oscillation is determined by amplification in a voltage-controlled amplifier 30, the amplification of which is controlled — via a peak-rectifying circuit 31 and an analog storage unit 32 — by the amplitude of a signal which represents the amplitude of the fluctuations in blood temperature. After initiating the injection, the output of the peak rectifier circuit is interrupted by switch contact $S_{3b}$ opening. The voltage-controlled amplifier 30 then reflects the amplification — via the storage unit 32 — which was in effect the moment when switching off occurred.

The level of direct-current voltage potential is summed via a storage circuit 33 and contact $S_{3c}$ in a summation circuit 34. The signal $e_c$ — with proper frequency, phase and amplitude, as well as with proper direct current voltage potential — obtained in this way is used as reference for integration.

Figure 8:
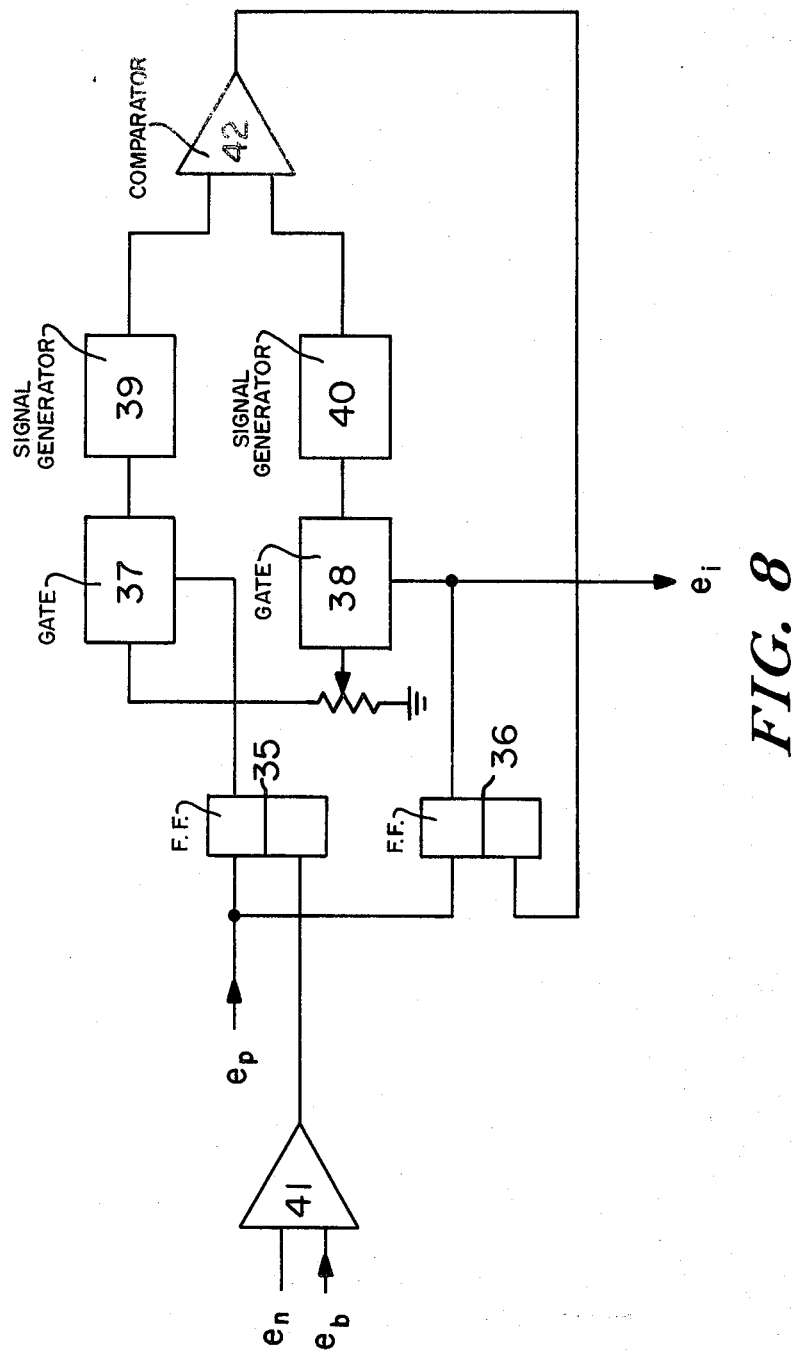
FIG. 8 is a schematic diagram illustrating an arrangement for switching the integrator on and off.

The time during which the integrator should remain open, is related to the blood flow — the greater the flow, the faster the indicator flows by, and integration time can be shortened. It can then be advantageous to discontinue integration after a period of time, the duration of which is determined by the difference in time between the beginning of the injection and the moment at which the temperature recorded by the sensor begins to fall. A circuit for producing a control signal for the integrator is shown in FIG. 8.

The moment of injection is represented by a pulse $e_p$ which switches over two flip-flop (or bistable) trigger circuits 35 and 36. When these trigger circuits are thrown, two gates 37 and 38 open so that generators 39 and 40 begin to operate. Generator 40 starts up slower than generator 39. If the signal $e_b$ which represents blood flow rises to $e_p$, comparator 41 switches over, whereby trigger circuit 35 is reset and generator 39 stopped. Signals from both generators are compared in the comparator 42. If generator 40 has reached the same potential as generator 39, the comparator 42 has reached the same potential as generator 39, the comparator 42 is switched over, whereby bistable trigger circuit 36 is reset. The desired control signal $e_i$ for the integrator is obtained from trigger circuit 36.

What is claimed is:

1. An arrangement for determining certain body properties of a patient which involve the blood, such as blood flow, from input data relating to preselected body activity of the patient and from sensing via a thermal sensor the temperature change in the circulating blood resulting from injecting into the blood stream at a predetermined rate a known quantity of an indicator fluid having a known temperature differential relative to the blood by way of a thermal sensor-equipped catheter arrangement introduced into the body, comprising:

a control assembly and
   a sterile disposable assembly operatively connected to said control assembly but isolated from the latter in terms of sterilization,
   said sterile disposable assembly being connected to the catheter and including first means for providing the known quantity of indicator fluid within a temperature-regulated environment, said first means including second means for introducing the known quantity of indicator fluid thermally regulated by said environment into the catheter at the predetermined rate, and said control assembly including third means response to the input data relating to the preselected body activity of the patient for providing the temperature-regulated environment, fourth means coupled to said third means and to said first means for controlling said third means and for controlling the introduction of the known quantity of indicator fluid via the catheter into the patient's blood stream at the predetermined rate and fifth means operatively connected to the thermal sensor and responsive to said third means for calculating the desired body property of the patient from information derived via the thermal sensor.

2. The arrangement according to claim 1 wherein the catheter arrangemnt is part of the sterile disposable assembly.

3. The arrangement according to claim 1 further including a source of indicator fluid connected to said first means and wherein said source of indicator fluid is part of said sterile disposable assembly.

4. An arrangement for determining certain body properties of a patient which involve the blood, such as blood flow, from sensing, via a thermal sensor mounted on a catheter arrangement introduced into the body, the temperature change in the circulating blood resulting from injecting into the blood stream at a predetermined rate a known quantity of an indicator fluid having a known temperature differential relative to the blood, comprising:

a control assembly and a sterile disposable assembly operatively connected to said control assembly but isolated from the latter in terms of sterilization, said sterile disposable assembly including
heat exchanging means having a source of supply of indicator fluid,
a syringe mechanism,
and a valve arrangement, interconnecting said heat exchanging means and said syringe mechanism with the catheter, and having predetermined directional effect on the flow indicator fluid, and said control assembly indluding
a thermostabilized unit substantially enclosing said sterile disposable assembly for providing a temperature-controlled environment for the latter,
first means coupled to said syringe mechanism for effecting a controlled application of motive power to said syringe mechanism,
a programmer, coupled to said thermostabilized unit and to said first means for controlling said unit and for controlling the injection into the blood stream of the predetermined quantity of the indicator fluid of known temperature at the predetermined rate, and
calculator means responsive to said programmer and to the thermal sensor contained in the catheter for calculating the desired body property of the patient following the injection.

5. An arrangement for measuring blood flow in the circulatory systems of a patient, in which there is injected into the blood stream via a catheter arrangement a known amount of an indicator fluid having a known thermal difference relative to the patient's blood, followed by measurement of the temperature difference obtained in the circulating blood effected by the injected indicator fluid at a point below the site of injection via a thermal sensing device mounted on the catheter arrangement, wherein the arrangement comprises two main assemblies which are operatively interconnected but which are separate in terms of sterilization, the first assembly including a programer (17) for controlling the injection of indicator fluid, a thermostabilized unit (3) connected to said programmer, first means (12, 13) for effecting a pumping action connected to said programmer, and a calculator connected to said programmer and to the thermal sensing device, the other main assembly comprising a sterile disposable unit operatively connected to a reservoir means (1) containing indicator fluid, said disposable unit including heat exchanging means (2) extending within said thermostabilized unit, a syringe mechanism (7) situated within said thermostabilized unit and operatively connected to said first means for providing indicator fluid intake and injection modes, and a valve arrangement (4,5,8) with a directional effect connected between said syringe mechanism and said heat exchanging means and connected to the cathether, whereby upon a controlled pumping provided by said first means governed by said programmer, indicator fluid flows from said reservoir means via said heat exchanging means and said valve arrangement to said syringe mechanism and thereupon via said valve arrangement and the catheter to the patient.

6. The arrangement according to claim 5 further comprising means (14) coupled to said programmer for detecting gas bubbles in the indicator fluid to be injected.

7. The arrangement according to claim 6 wherein said means for detecting air bubbles is adapted to be positioned relative to said sterile disposable unit to detect bubbles between said syringe mechanism and said valve arrangement.

8. The arrangement according to claim 6 wherein said programmer includes means responsive to said bubble detecting means for preventing the injection for preventing the injection of indicator fluid whenever a gas bubble is detected in the indicator fluid.

9. The arrangement according to claim 8 wherein said first means includes second means for causing said mechanism to change from the injection mode to the intake mode whenever a gas bubble is detected, and further comprising chambers means (6) disposed between said syringe mechanism and said valve arrangement, and having a volume which corresponds to at least the volume of indicator fluid ejected from said syring mechanism during the time interval required for said first means to cause said syringe mechanism to change from the injection mode to the intake mode.

10. The arrangement according to claim 6 wherein said programmer includes means responsive to said bubble detecting means for inhibiting said syringe mechanism during injection of indicator fluid into the patient whenever a gas bubble is detected in said indicator fluid.

11. The arrangement according to claim 6 wherein said bubble detecting means includes means for responding to a change in light transmitted through the indicator fluid effected by the procession of gas bubbles in the fluid passing said bubble detecting means.

12. The arrangement according to calim 6 wherein said bubble detecting means includes means for responding to changes in the dielectric constant of the indicator fluid due to the existence of gas bubbles in the fluid passing said detecting means.

13. The arrangement according to claim 3 wherein said heat exchanging means includes a hose arrangement.

14. The arrangement according to claim 13 wherein said hose arrangement partially extends within said thermostabilized unit.

15. The arrangement according to claim 5 wherein said first means includes a pneumatic cylnder.

16. The arrangement according to claim 5 wherein said first means includes an electric motor.

17. The arrangement according to claim 5 further comprising third means providing pre-injection of at least some of the known quantity of indicator fluid for enabling the catheter to be filled with the indicator fluid at the desired temperature and be cooled before the injection of the remainder of the known quantity of indicator fluid.

18. The arrangement according to claim 17 wherein the injection rate of said third means during pre-injection is less at the termination thereof than at the commencement thereof.

19. The arrangement according to claim 5 further comprising circuit means for providing the integration of temperature changes derived from the thermal sensor relative to a variable reference which reference varies during the integration in compensation for the natural variations of the patient's blood temperature.

20. The arrangement according to claim 19 further including circuit means for providing the compensatory variation of said reference, including means for recording blood temperature prior to an injection of indicator fluid and following the completion of said integration, and further includes means for providing a correction factor to be subtracted from the integrated value, which is a factor of the integration time and of the blood temperature prior to the injection and after the completed injection.

21. The arrangement according to claim 19 wherein said calculator means includes circuit means for controllably actuating the integration for a period predeterminably related to the time interval defined by the time at which the indicator fluid is injected to when the first temperature change is determined from the thermal sensor.

22. The arrangement according to claim 19 further including an electric oscillator, coupled to said circuit means and controlled in frequency, phase and amplitude relative to the natural variation in blood temperature which obtains immediately before injection, for generating an oscillating reference signal for said circuit means.

* * * * *

UNITED STATES PATENT OFFICE
CERTIFICATE OF CORRECTION

PATENT NO. : 3,915,155
DATED : October 28, 1975
INVENTOR(S) : NILS BERTIL JACOBSON AND KURT TOMMY RIBBE It is certified that error appears in the above-identified patent and that said Letters Patent are hereby corrected as shown below:

Column 8, line 13 should read --and a calculator (16)--.

Signed and Sealed this

Fifteenth Day of February 1977

[SEAL]

Attest:

RUTH C. MASON
*Attesting Officer*

C. MARSHALL DANN
*Commissioner of Patents and Trademarks*